US009461941B2

(12) United States Patent
Mehta et al.

(10) Patent No.: US 9,461,941 B2
(45) Date of Patent: Oct. 4, 2016

(54) 128 GIGABIT FIBRE CHANNEL PHYSICAL ARCHITECTURE

(71) Applicant: Brocade Communications Systems, Inc., San Jose, CA (US)

(72) Inventors: Anil Mehta, Milpitas, CA (US); Scott Kipp, Santa Barbara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 150 days.

(21) Appl. No.: 14/308,143

(22) Filed: Jun. 18, 2014

(65) Prior Publication Data

US 2014/0376566 A1 Dec. 25, 2014

Related U.S. Application Data

(60) Provisional application No. 61/839,349, filed on Jun. 25, 2013, provisional application No. 61/862,451, filed on Aug. 5, 2013, provisional application No. 61/863,309, filed on Aug. 7, 2013, provisional application No. 61/880,017, filed on Sep. 19, 2013, provisional application No. 61/886,750, filed on Oct. 4, 2013, provisional application No. 61/909,042, filed on Nov. 26, 2013.

(51) Int. Cl.
*H04L 12/931* (2013.01)
*H04L 12/935* (2013.01)
*H04B 10/40* (2013.01)
*H04L 12/40* (2006.01)
*H04L 12/24* (2006.01)

(52) U.S. Cl.
CPC .............. *H04L 49/357* (2013.01); *H04L 49/30* (2013.01); *H04L 49/40* (2013.01); *H04B 10/40* (2013.01); *H04L 12/4013* (2013.01); *H04L 41/0681* (2013.01)

(58) Field of Classification Search
CPC ............. H04L 12/4013; H04L 49/357; H04L 41/0681; H04L 41/0803; H04L 41/0896
See application file for complete search history.

(56) References Cited

U.S. PATENT DOCUMENTS

| 9,172,661 | B1 * | 10/2015 | Dropps | H04L 49/352 |
| 2010/0229071 | A1 * | 9/2010 | Ganga | H03M 13/05 714/776 |
| 2011/0320905 | A1 * | 12/2011 | Lin | H04L 1/0067 714/752 |
| 2012/0075999 | A1 * | 3/2012 | Ko | H04L 43/0858 370/238 |
| 2012/0096310 | A1 * | 4/2012 | Varanasi | G06F 11/1032 714/15 |

(Continued)

OTHER PUBLICATIONS

Gustlin et al., EEE support for 100 Gb/s, IEEE P802.3bj, Atlanta, Nov. 2011.*

*Primary Examiner* — Chi H Pham
*Assistant Examiner* — Shailendra Kumar
(74) *Attorney, Agent, or Firm* — Blank Rome, LLP (57) ABSTRACT

The PCS and FEC layers are combined into a single layer and the number of lanes is set at four lanes. The combination allows removal of many modules as compared to a serial arrangement of a PCS layer and an FEC layer. The reduction in the number of lanes, as compared to 100 Gbps Ethernet, provides a further simplification or cost reduction by further reducing the needed gates of an ASIC to perform the functions. Changing the lanes in the FEC layer necessitates changing the alignment marker structure. In the preferred embodiment a lane zero marker is used as the first alignment marker in each lane to allow rapid sync. A second alignment marker indicating the particular lane follows the first alignment marker.

18 Claims, 7 Drawing Sheets

(56) References Cited

U.S. PATENT DOCUMENTS

2013/0177309 A1* 7/2013 El-Ahmadi ............ H04B 10/40
  398/25
2013/0208771 A1* 8/2013 Wang ..................... H04L 25/02
  375/219
2014/0189459 A1* 7/2014 Vijayaraghavan .. H03M 13/353
  714/755

* cited by examiner

| FEC lane, i | Reed-Solomon symbol index, k (10-bit symbols) | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| 0 | am_tx_0 | | | | | | | | am_tx_4 | | | | am_tx_8 | | | | am_tx_12 | | | | am_tx_16 | | | | | |
| 1 | am_tx_1 | | | | | | | | am_tx_5 | | | | am_tx_9 | | | | am_tx_13 | | | | am_tx_17 | | | | | |
| 2 | am_tx_2 | | | | | | | | am_tx_6 | | | | am_tx_10 | | | | am_tx14 | | | | am_tx_18 | | | | | |
| 3 | am_tx_3 | | | | | | | | am_tx_7 | | | | am_tx_11 | | | | am_tx15 | | | | am_tx_19 | | | | | |

*Fig. 7 (Prior Art)*

| FEC lane, i | Reed-Solomon symbol index, k (10-bit symbols) | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| 0 | am_tx_0 | | | | | | | | am_tx_0 | | | | |
| 1 | am_tx_0 | | | | | | | | am_tx_1 | | | | |
| 2 | am_tx_0 | | | | | | | | am_tx_2 | | | | |
| 3 | am_tx_0 | | | | | | | | am_tx_3 | | | | |

*Fig. 10*

Bit Position: 0 1 2    9 10    17 18    25 26    33 34    41 42    49 50    57 58    65

| 0 | M₀ | M₁ | M₂ | BIP₃ | M₄ | M₅ | M₆ | BIP₇ |

*Fig. 8 (Prior Art)*

| PCS lane # | Encoding {M₀, M₁, M₂, BIP₃, M₄, M₅, M₆, BIP₇} |
|---|---|
| 0 | 0x90, 0x76, 0x47, BIP₃, 0x6F, 0x89, 0xB8, BIP₇ |
| 1 | 0xF0, 0xC4, 0xE6, BIP₃, 0x0F, 0x3B, 0x19, BIP₇ |
| 2 | 0xC5, 0x65, 0x9B, BIP₃, 0x3A, 0x9A, 0x64, BIP₇ |
| 3 | 0xA2, 0x79, 0x3D, BIP₃, 0x5D, 0x86, 0xC2, BIP₇ |

*Fig. 9 (Prior Art)*

128 GIGABIT FIBRE CHANNEL PHYSICAL ARCHITECTURE

CROSS REFERENCE TO RELATED APPLICATIONS

This application claims the benefit under 35 U.S.C. §119 (e) of U.S. Provisional Patent Application Ser. Nos. 61/839,349 entitled "128Gb FCp Architecture," filed Jun. 25, 2013; 61/862,451 entitled "128Gb FCP Architecture," filed Aug. 5, 2013; 61/863,309 entitled "128G FCP Architecture," filed Aug. 7, 2013; 61/880,017 entitled "128GFCP Architecture," filed Sep. 19, 2013; 61/886,750 entitled "128GFCp Architecture," filed Oct. 4, 2013; and 61/909,042 entitled "128GFC Speed Negotiation Topics," filed Nov. 26, 2013, which are all hereby incorporated by reference.

BACKGROUND OF THE INVENTION

1. Field of the Invention

The invention relates to the physical layer of high speed networking.

2. Description of the Related Art

Speeds of network links are ever increasing. Today Ethernet speeds of 40 and 100 Gigabits per second (Gbps) are available, though at a very high cost. Fibre Channel speeds of 16 Gbps are available and 32 Gbps devices are in development. To continue widespread use of Fibre Channel, the next speed generation must be developed. While elements could be used from 40 Gbps and 100 Gbps Ethernet, the use would raise concerns of the high cost of those protocols being transferred to the Fibre Channel variant, which would limit growth and deployment. Therefore it is desirable to advance Fibre Channel to the next speed generation but not to absorb the high costs of the high speed Ethernet variations.

SUMMARY OF THE INVENTION

In the preferred embodiment of the present invention the PCS and FEC layers are combined into a single layer on a single chip and the number of lanes is set at four lanes. The combination allows removal of many modules as compared to a serial arrangement of a PCS layer and a Reed-Solomon FEC layer. The reduction in the number of lanes, as compared to 100 Gbps Ethernet, provides a further simplification or cost reduction by further reducing the needed gates of an ASIC to perform the functions. Changing the lanes in the FEC layer necessitates changing the alignment marker structure. In the preferred embodiment a lane zero marker is used as the first alignment marker in each lane to allow rapid sync. A second alignment marker indicating the particular lane follows the first alignment marker.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION

Figure 1:
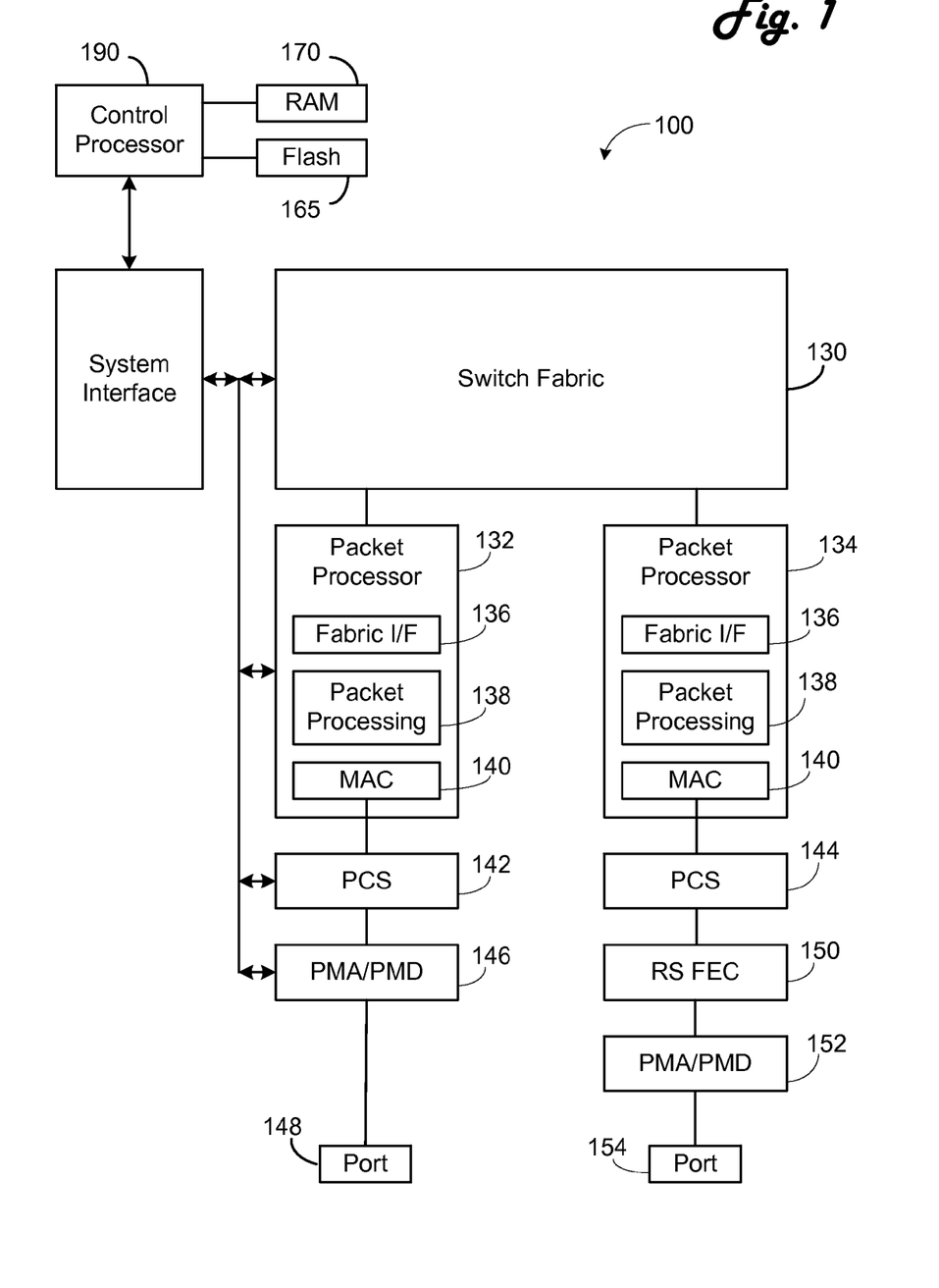
FIG. 1 is a block diagram of a high speed Ethernet switch.

Referring now to FIG. 1, an exemplary Ethernet switch 100 is shown. A switch fabric 130 forms the basic switching matrix. Connected to the switch fabric 130 are a 40 Gbps packet processor 132 and a 100 Gbps packet processor 134. Each packet processor 132 and 134 includes a fabric interface 136 connected to the switch fabric 130. Each packet processor 132, 134 includes a packet processing module 138 which performs conventional packet analysis and processing functions. Each packet processor 132, 134 also includes a media access control (MAC) module 140. Network data passes through the fabric interface 136, packet processing module 138 and MAC module 140 in series in the transmit direction and in the inverse order in the receive direction.

A PCS module 142 is connected to the 40 Gbps packet processor 132 while a PCS module 144 is connected to the 100 Gbps packet processor 134. A physical medium attachment (PMA) and physical medium dependent (PMD) module 146 is connected between the PCS 142 and a port 148. A Reed-Solomon forward error correction (FEC) module 150 is connected to the PCS module 144. A PMA/PMD module 152 is connected between the FEC module 150 and a port 154.

A control processor 190 is connected to the switch fabric 130, packet processors 132 and 134, PCS modules 142 and 144, PMA/PMD modules 146 and 152 and FEC module 152 to control switch operations. Random access memory (RAM) 170 is connected to the processor 190 to act as working storage. A flash memory 165 is connected to the processor 190 to act as permanent storage for the firmware and other software used to operate the switch 100.

This is an exemplary architecture and numerous other architectures as well known to those skilled in the art exist.

Figure 2:
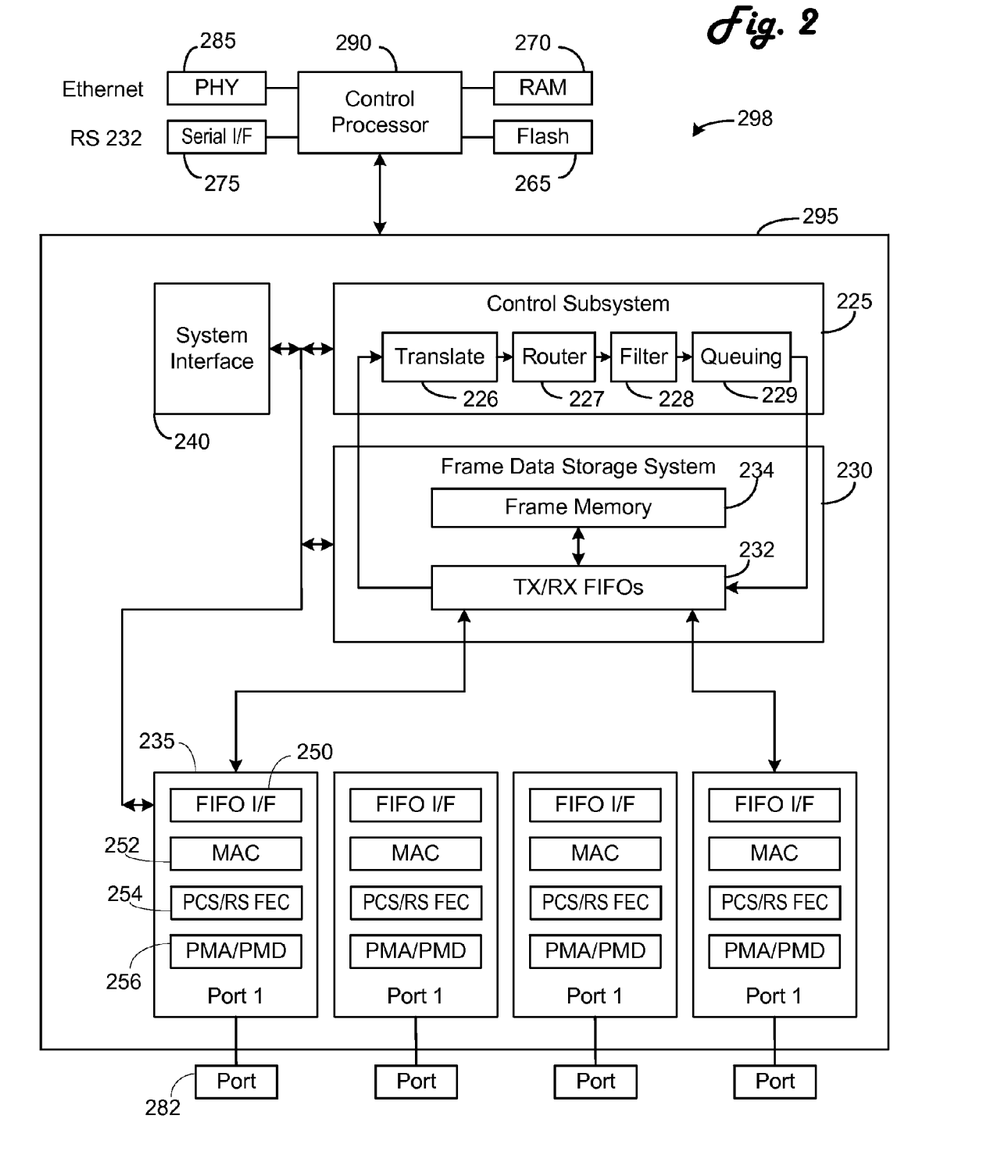
FIG. 2 is a block diagram of a Fibre Channel switch according to the present invention.

FIG. 2 is a block diagram of an exemplary 128 Gbps Fibre Channel (FC) switch 298 according to the present invention. A control processor 290 is connected to a switch ASIC 295. The switch ASIC 295 is connected to ports 282. Generally the control processor 290 configures the switch ASIC 295 and handles higher level switch operations, such as the name server, routing table setup, and the like. The switch ASIC 295 handles general high speed inline or in-band operations, such as switching, routing and frame translation. The control processor 290 is connected to flash memory 265 or the like to hold the software and programs for the higher level switch operations; to random access memory (RAM) 270 for working memory, such as the name server and router tables; and to an Ethernet PHY 285 and serial interface 275 for out-of-band management.

The switch ASIC 295 has four basic modules: port modules 235, a frame data storage system 230, a control subsystem 225 and a system interface 240. The port modules 235 perform the lowest level of packet transmission and reception. Generally, frames are received from a port 282 and provided to the frame data storage system 230. Further, frames are received from the frame data storage system 230 and provided to the port 282. The frame data storage system 230 includes a set of transmit/receive FIFOs 232, which interface with the port modules 235, and a frame memory 234, which stores the received frames and frames to be transmitted. The frame data storage system 230 provides initial portions of each frame, typically the frame header and a payload header for FCP frames, to the control subsystem 225. The control subsystem 225 has the translate 226, router 227, filter 228 and queuing 229 blocks. The translate block 226 examines the frame header and performs any necessary address translations. There can be various embodiments of the translation block 226, with examples of translation operation provided in U.S. Pat. Nos. 7,752,361 and 7,120,728, both of which are incorporated herein by reference in their entirety. Those examples also provide examples of the control/data path splitting of operations. The router block 227 examines the frame header and selects the desired output port for the frame. The filter block 228 examines the frame header, and the payload header in some cases, to determine if the frame should be transmitted. The queuing block 229 schedules the frames for transmission based on various factors including quality of service, priority and the like.

Each port module 235 includes a series of submodules. A FIFO interface submodule 250 provides the interface to the FIFOs 232. A MAC submodule 252 is connected to the FIFO interface 250. A combined PCS/FEC submodule 254 according to the present invention is connected to the MAC submodule 252. A PMA/PMD submodule 256 is connected to the PCS/FEC submodule 254 and the respective port 282.

This is an exemplary architecture and numerous other architectures as well known to those skilled in the art exist.

Figure 3:
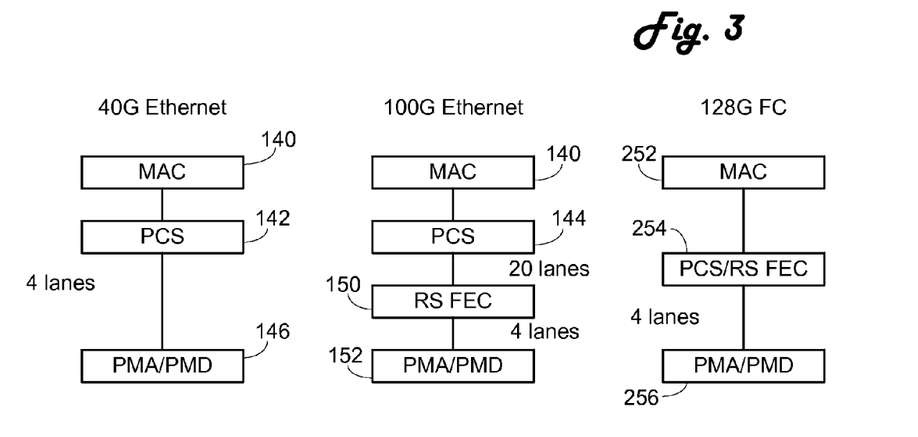
FIG. 3 compares the physical layers of 40 Gbps Ethernet, 100 Gbps Ethernet and 128 Gbps Fibre Channel according to the present invention.

FIG. 3 compares the physical layers of 40 Gbps Ethernet, 100 Gbps Ethernet and 128 Gbps FC according to the present invention. The 40 Gbps Ethernet layers include the MAC 140, the PCS 142 and the PMA/PMD 146. There are four lanes in the PCS 142 and the PMA/PMD 146. IEEE Std 802.3 ba-2010 and IEEE Std P802.3 bj/D3.0 detail this operation and are hereby incorporated by reference. The 100 Gbps Ethernet layers include the MAC 140, the PCS 144, the RS FEC 150 and the PMA/PMD 152. There are 20 lanes in the PCS 144 and to the FEC 150 and four lanes in the PMA/PMD 152, with the FEC 150 performing a four lane to 20 lane conversion. IEEE Std 802.3 ba-2010 details portions of this operation, with IEEE Std P802.3 bj/D3.0 providing details on the RS FEC layer. The 128 Gbps FC layers include the MAC 252, the combined PCS/FEC 254 and the PMA/PMD 256. Both the combined PCS/FEC 254 and PMA/PMD 256 are four lanes.

One factor that bears heavily on the cost of a network interface is the gate count of the ASIC used to develop the interface. The 40 Gbps Ethernet interface is relatively simple as it is only four lanes and does not include a Reed-Solomon (RS) FEC module. Reed-Solomon error correction is greatly preferred at the 100 Gbps range due its better correction capabilities. This relative simplicity reduces the number of needed gates in the ASIC and therefore reduces the cost. This would suggest that four lanes might be a good approach for developing the 128 Gbps physical layers. But 40 Gbps Ethernet does not include a RS FEC and RS FEC will be necessary at 128 Gbps. Therefore a solution based on the 40 Gbps Ethernet design alone is not sufficient.

The 100 Gbps Ethernet layers include all of the necessary modules or layers, as FEC is present, but the PCS and FEC layers are 20 lanes wide. This large number of lanes greatly increases the number of gates needed for a 100 Gbps Ethernet solution. This is a least a portion of the reason for the high cost of 100 Gbps Ethernet. Therefore 100 Gbps Ethernet also does not form a solo basis for a solution for 128 Gbps FC.

In the preferred embodiment the 128 Gbps FC layers use only four lanes for all portions, the PCS, the RS FEC and the PMA/PMD. This reduces the gate count, particularly as compared to 100 Gbps Ethernet. It would be useful to use the 100 Gbps Ethernet RS FEC module but this cannot be directly done as that module is for 20 lanes. For the preferred embodiment the 100 Gbps Ethernet RS FEC is modified to four lanes by changing the alignment markers from the arrangement used for 20 lanes to a new arrangement using four lanes with simplified alignment markers, as described in more detail below. This provides a large reduction in the gate count from the 100 Gbps Ethernet RS FEC to the 128 Gbps FC RS FEC.

While the reduction from 20 lanes to four lanes reduces the gate count significantly, further gate count reduction is desirable to allow more ports to be developed on a given ASIC. As explained in more detail below, the serial and separate module arrangement of the PCS 144 and the RS FEC 150 in 100 Gbps Ethernet allows great flexibility by allowing the PCS and the RS FEC to come from different vendors. However, this flexibility comes at a cost of duplicated logic blocks between the PCS and RS FEC modules. This duplication increases gate count and therefore further increases the 100 Gbps Ethernet cost structure. The preferred combination of the PCS and the RS FEC into the PCS/FEC module 254 allows removal of the duplicated logic blocks, thereby reducing the needed number of gates and thus reducing component costs. The reduction provided by the combination into a single module is discussed on more detail below.

Figure 4:
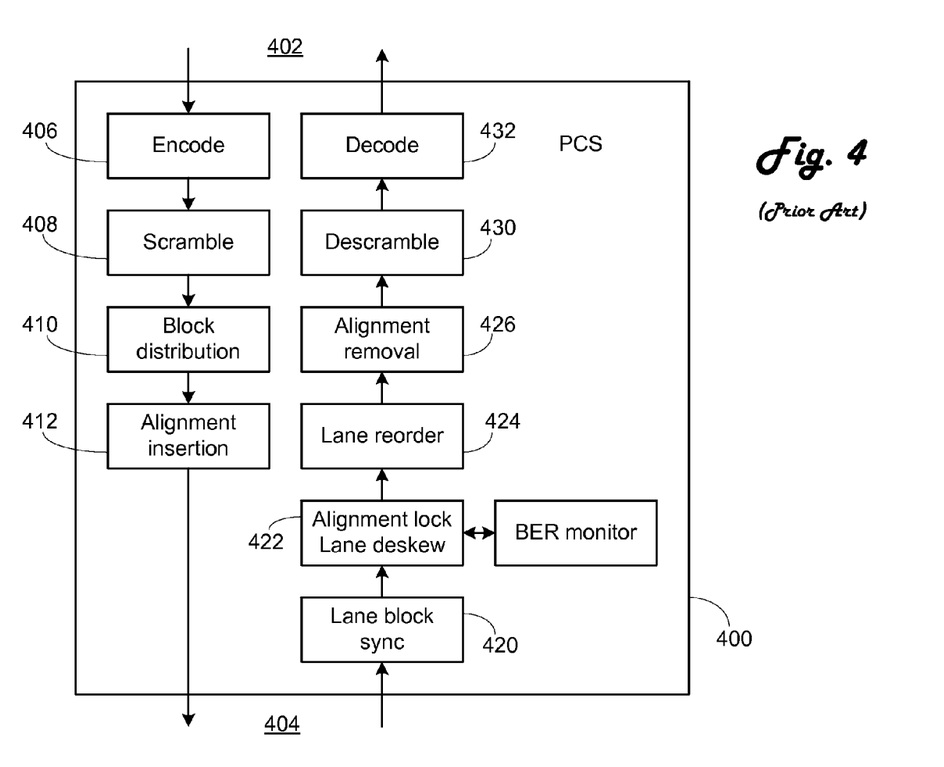
FIG. 4 is a block diagram of an exemplary physical coding sublayer (PCS) module for 40 Gbps or 100 Gbps Ethernet according to the prior art.

FIG. 4 illustrates the basic block design of the PCS layer for 40 Gbps and 100 Gbps Ethernet, though the number of lanes varies between the two. A PCS block 400 includes an interface 402 to the MAC layer and an interface 404 to the PMA/PMD or FEC layer. Describing the transmit direction first, the incoming 64 b block stream is received by an encode module 406, which produces a 66 b block stream as an output. This 66 b block stream is received by a scrambler 408. The output of the scrambler 408 is provided to a block distribution module 410 to split the incoming block stream into different lanes. The blocked stream is provided to an alignment insertion module 412 to have alignment markers inserted into the block stream. The output of the alignment insertion module 412 is provided from the PCS 400.

In the receive direction the first module is a lane block sync module 420 which synchronizes each of the blocks of each lane. The output of the lane block sync module 420 is provided to an alignment lock and lane deskew module 422 which locks the individual lanes using the alignment markers and then aligns the lanes. The aligned and deskewed output is received by a lane reorder module 424 which reorders the lanes into the single block stream. The single block stream is received at an alignment marker removal module 426, which removes the embedded alignment markers. The block stream is then descrambled by a descramble module 430 and decoded by a decode module 432. The output of the decode module is the 64 b block stream used in the MAC.

Figure 5:
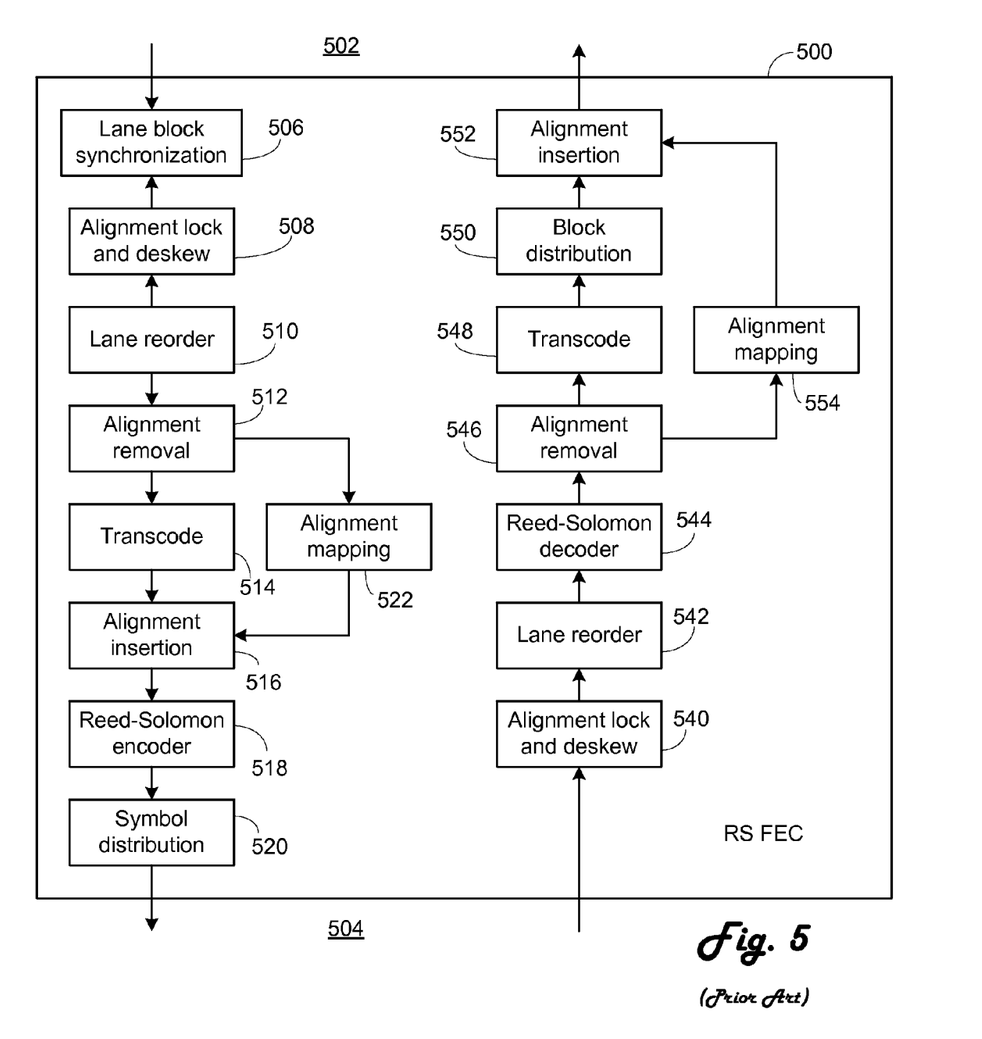
FIG. 5 is a block diagram of an exemplary forward error correction (FEC) module for 100 Gbps Ethernet according to the prior art.

FIG. 5 illustrates the basic block design of the RS FEC layer for 100 Gbps Ethernet according to IEEE Std P802.3 bj. An RS FEC block 500 includes an interface 502 to the PCS layer and an interface 504 to the PMA/PMD layer. Describing the transmit direction first, a lane block sync module 506, similar to the lane block sync module 420 is present. Following are an alignment lock and deskew module 508, a lane reorder module 510 and an alignment removal module 512. These modules are similar to the same modules in the PCS block 400. After alignment marker removal a transcode module 514 performs a 64 b/66 b to 256 b/257 b transcode operation on four 66 b blocks. An alignment insertion module 516 reinserts the alignment markers removed by alignment removal module 512. In parallel an alignment mapping module 522 compensates for the operation of the symbol distribution function described below and rearranges the alignment marker bits so that they appear on the FEC lanes intact and in the desired sequence. After alignment marker operations, a Reed-Solomon encoder module 518 performs the Reed-Solomon encoding used for error correction. The final transmit module is a symbol distribution module 520 which distributes the error correction edited data blocks into the four FEC lanes.

In the receive direction the first two modules are an alignment lock and deskew module 540 and a lane reorder module 542. After reordering, a Reed-Solomon decoder module 544 decodes the error correction bit stream. After error correction decoding, the stream has its alignment markers removed by alignment removal module 546. The 256 b/257 b data stream is transcoded in transcode module 548 into the four 64 b/66 b packets. The 64 b/66 b packets are distributed to the 20 lanes by a block distribution module 550. Alignment marker mapping is done by alignment mapping module 554 and alignment marker insertion is done by alignment insertion module 552. The data streams are then provided to the PCS block 400.

Figure 6:
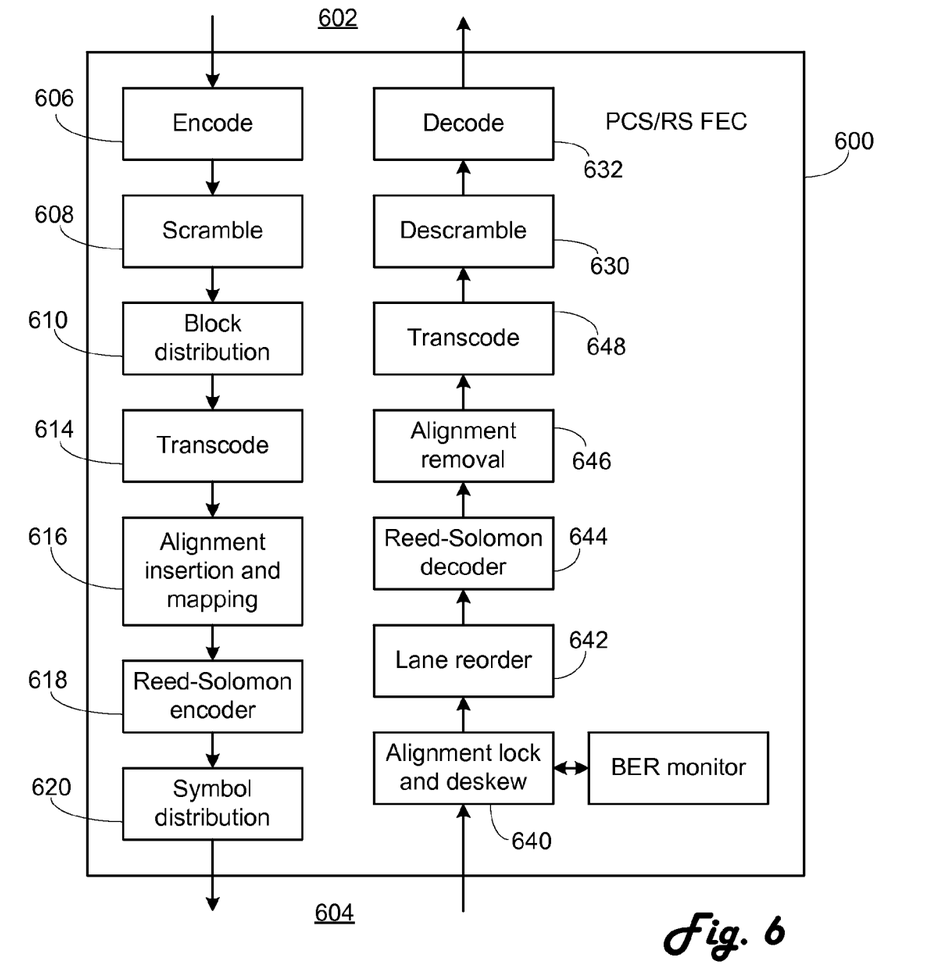
FIG. 6 is a block diagram of combined PCS/FEC module for 128 Gbps Fibre Channel according to the present invention.

FIG. 6 illustrates the block diagram of a combined PCS/FEC layer developed on a single chip for 128 GBPS FC according to the present invention. A single chip combined PCS/FEC block 600 includes an interface 602 to the MAC layer and an interface 604 to the PMA/PMD layer. Describing the transmit direction first, the modules are similar to the initial modules of the transmit path of the PCS block 400. The incoming 64 b block stream is received by an encode module 606, which produces a 66 b block stream as an output. This 66 b block stream is received by a scrambler 608. The output of the scrambler 608 is provided to a block distribution module 610 to split the incoming block stream into different lanes. Then follow modules similar to the final modules of the RS FEC block 500. A transcode module 614 performs a 64 b/66 b to 256 b/257 b transcode operation on four 66 b blocks. An alignment insertion and mapping module 616 maps the alignment markers as above and inserts the alignment markers into the data stream. After alignment marker insertion, a Reed-Solomon encoder module 618 performs the Reed-Solomon encoding used for error correction. The final transmit module is a symbol distribution module 620 which distributes the error correction edited data blocks into the four FEC lanes.

In the receive direction the initial modules are similar to the initial modules of the receive path of the FEC block 500. The first two modules are an alignment lock and deskew module 640 and a lane reorder module 642. After reordering, a Reed-Solomon decoder module 644 decodes the error correction bit stream. After error correction decoding, the stream has its alignment markers removed by alignment removal module 646. The 256 b/257 b data stream is transcoded in transcode module 648 into the four 64 b/66 b packets. The final modules are similar to the final modules of the PCS block 400. The block stream is then descrambled by a descramble module 630 and decoded by a decode module 632. The output of the decode module is the 64 b block stream used in the MAC.

Comparing the single chip combined PCS/FEC block 600 with a series combination of the PCS block 400 and the FEC block 500, five alignment and lane order modules have been removed from the transmit path and seven alignment and lane order modules have been removed from the receive path. Further, it is understood that the modules that are still present that are similar to those in the FEC block 500 are also smaller as the number of lanes is reduced from 20 to four. These changes, the module removal formed by the combination of the PCS and RS FEC layers into one block on one chip and the lane number reduction, result in a significant reduction in the gate count of the 128 Gbps physical layer components as opposed to reuse of the 100 Gbps Ethernet components. This allows either cost reductions or increased port counts of a given ASIC.

Figures 7, 10:
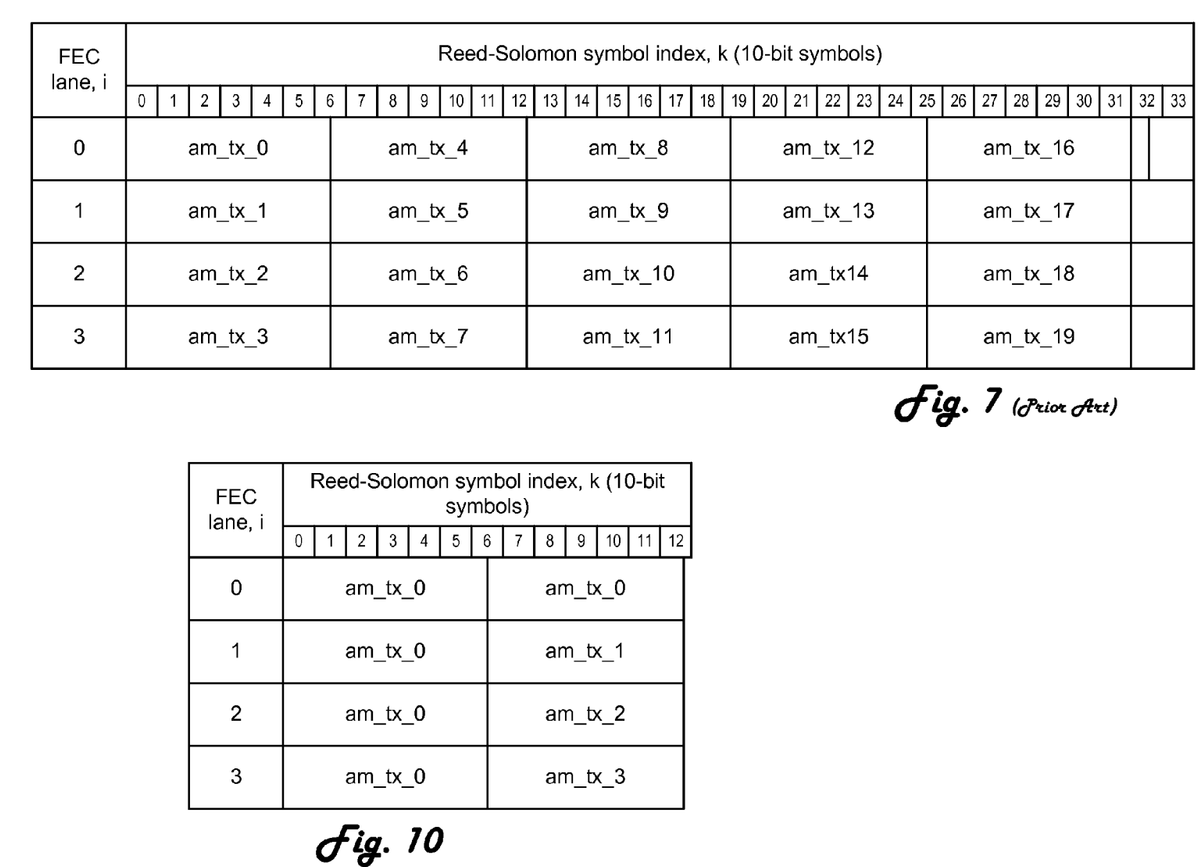
FIG. 7 is a diagram of alignment markers in the FEC module for 100 Gbps Ethernet according to the prior art.
FIG. 10 is a diagram of alignment markers in the FEC module for 128 Gbps Fibre Channel according to the present invention.
Figure 8:
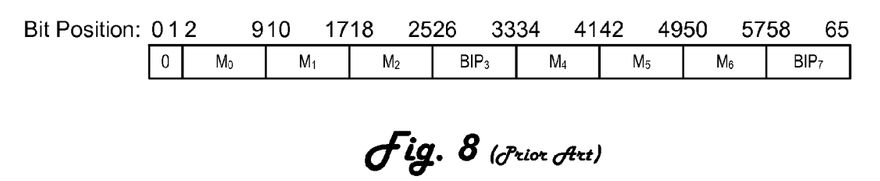
FIG. 8 is a detailed diagram of an alignment marker for 40 Gbps or 100 Gbps Ethernet according to the prior art.
Figure 9:
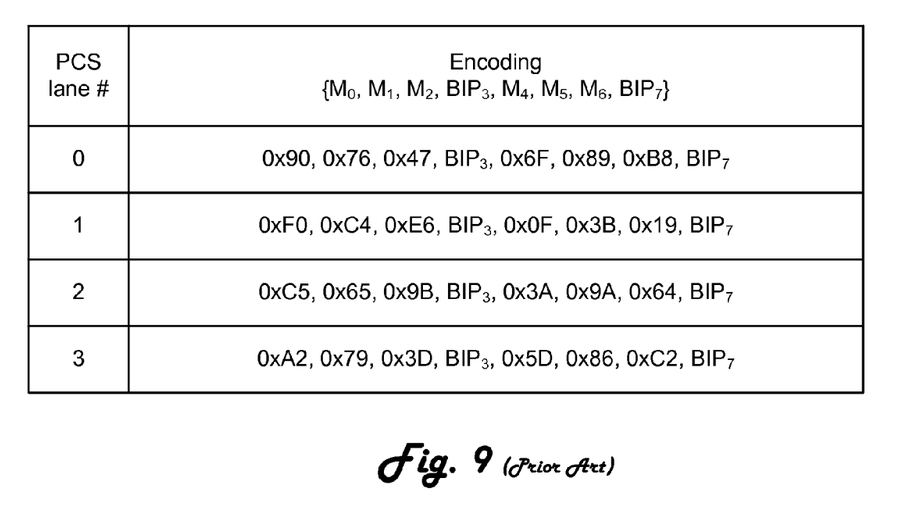
FIG. 9 is a diagram of alignment markers in the PCS module for 40 Gbps Ethernet according to the prior art.

As the number of lanes has changed from the 100 Gbps Ethernet FEC layer as specified in IEEE Std P802.3 bj, it is determined that changes must also be made in the alignment marker arrangements. Alignment markers are inserted every 16383 66 bit blocks to allow lane sync and alignment. FIG. 8 is copied from FIG. 82-9 from IEEE Std 802.3 ba-2010 and shows the composition of an alignment marker, where the M fields are designated lane values and the BIP fields are Bit Interleaved Parity fields to allow measurement of bit error rate. FIG. 9 is copied from Table 82-3 of IEEE Std 802.3 ba-2010 and shows the actual M fields for 40 Gbps Ethernet. It is noted that four separate and different alignment markers are defined to allow determination of the lane. FIG. 7 is an illustration of the alignment marker mapping in the FEC layer between the four lanes of the FEC and the 20 lanes of the PCS layer. This is copied from FIG. 91-4 of Section 91.5.2.6 of IEEE Std P802.3 bj/D3.2. As can be seen, the 100 Gbps Ethernet FEC alignment marker mapping is complicated and alignment and synchronization takes time and many gates. It is noted that IEEE Std P802.3 bj/D3.2 modifies the alignment marker values for lanes 0-3 so that they are all the same, so that in the first column of FIG. 7 the values for am_tx_0 to am_tx_3 are identical, all effectively becoming am_tx_0. This was done to allow more rapid sync with fewer gates, the actual lanes being able to be determined by the following other alignment markers.

FIG. 10 indicates the preferred alignment markers for 128 Gbps FC. The 514 bits of alignment markers are provided every 4096 FEC code words. Similar to the modification done by IEEE Std P802.3 bj/D3.2, an initial alignment marker value that is identical is used for each lane. This initial alignment marker is followed by a second alignment marker value, each of which is different and indicates the actual lane. This alignment marker pair combination allows the use of the rapid sync of 100 Gbps Ethernet but provides simple indication of lanes similar to 40 Gbps Ethernet. An additional change in the preferred embodiment is that BIP fields are no longer used. Instead fixed DC balanced values are provided in the transmit path and ignored in the receive path.

By reducing the number of lanes from 20 in the PCS and FEC layers of 100 Gbps Ethernet to four lanes and by combining the PCS and FEC layers into a combined layer on a single chip, a great reduction in needed gates as compared to 100 Gbps Ethernet occurs, allowing either cost reductions or increased number of ports per ASIC. The change in lane in the FEC necessitates a change in the alignment marker scheme. The scheme is formed by placing a lane zero alignment marker in each lane, to allow rapid sync, and then following that with an alignment marker which indicates the lane.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A physical layer network interface link apparatus comprising:
   a combined physical coding sublayer (PCS) and Reed-Solomon (RS) forward error correction (FEC) sublayer module, said combined PCS and RS FEC module developed on a single chip,
   wherein said combined PCS and RS FEC module includes:
      a media access control (MAC) interface for connection to a MAC layer providing or receiving a stream of 64 bit blocks;
      a physical media attachment (PMA) interface for connection to a PMA layer utilizing four lanes;
      an RS FEC encoder module; and
      an RS FEC decoder module, and
   wherein said combined PCS and RS FEC module operates using only four lanes.

2. The apparatus of claim 1, said combined PCS and RS FEC module further including:
   a transmit path; and
   a receive path,
   wherein said transmit path includes:
      an encode module connected to said MAC interface;
      a scramble module connected to said encode module;
      a block distribution module connected to said scramble module;
      a transmit transcode module to transcode from 64b/66b blocks to 256b/257b blocks connected to said block distribution module;
      an alignment marker insertion module connected to said transmit transcode module;
      said RS FEC encode module connected to said alignment marker insertion module; and
      a symbol distribution module connected to said RS FEC encode module and said PMA interface, and
   wherein said receive path further includes:
      an alignment lock and deskew module connected to said PMA interface;
      a lane reorder module connected to said alignment lock and deskew module;
      said RS FEC decoder module connected to said lane reorder module;
      an alignment marker removal module connected to said RS FEC decoder module;
      a receive transcode module to transcode from 256b/257b blocks to 64b/66b blocks connected to said alignment marker removal module;
      a descramble module connected to said receive transcode module;
      a decode module connected to said descramble module and said MAC interface.

3. The apparatus of claim 2, wherein said alignment markers are in the form of an alignment marker pair, said alignment marker pair including a first alignment marker for lane zero and a second alignment marker for the appropriate lane on which said alignment marker pair is provided.

4. The apparatus of claim 3, wherein said alignment markers do not include bit interleaved parity (BIP) fields but include fixed DC balanced values instead.

5. The apparatus of claim 2, where there is only a single alignment marker insertion module and a single alignment marker removal module in said combined PCS and RS FEC module.

6. The apparatus of claim 1, wherein the network interface link is a 128 Gbps Fibre Channel network link.

7. A physical layer network interface link apparatus comprising:
   a media access control (MAC) layer having an interface providing or receiving a stream of 64 bit blocks; and
   a combined physical coding sublayer (PCS) and Reed-Solomon (RS) forward error correction (FEC) sublayer module, said combined PCS and RS FEC module developed on a single chip,
   wherein said combined PCS and RS FEC module includes:
      a MAC interface connected to said MAC layer interface;
      a physical media attachment (PMA) interface for connection to a PMA layer utilizing four lanes;
      an RS FEC encoder module; and
      an RS FEC decoder module, and
   wherein said combined PCS and RS FEC module operates using only four lanes.

8. The apparatus of claim 7, said combined PCS and RS FEC module further including:
   a transmit path; and
   a receive path,
   wherein said transmit path includes:
      an encode module connected to said MAC interface;
      a scramble module connected to said encode module;
      a block distribution module connected to said scramble module;
      a transmit transcode module to transcode from 64b/66b blocks to 256b/257b blocks connected to said block distribution module;
      an alignment marker insertion module connected to said transmit transcode module;
      said RS FEC encode module connected to said alignment marker insertion module; and
      a symbol distribution module connected to said RS FEC encode module and said PMA interface, and
   wherein said receive path further includes:
      an alignment lock and deskew module connected to said PMA interface;
      a lane reorder module connected to said alignment lock and deskew module;
      said RS FEC decoder module connected to said lane reorder module;
      an alignment marker removal module connected to said RS FEC decoder module;
      a receive transcode module to transcode from 256b/257b blocks to 64b/66b blocks connected to said alignment marker removal module;
      a descramble module connected to said receive transcode module;

a decode module connected to said descramble module and said MAC interface.

9. The apparatus of claim 8, wherein said alignment markers are in the form of an alignment marker pair, said alignment marker pair including a first alignment marker for lane zero and a second alignment marker for the appropriate lane on which said alignment marker pair is provided.

10. The apparatus of claim 9, wherein said alignment markers do not include bit interleaved parity (BIP) fields but include fixed DC balanced values instead.

11. The apparatus of claim 8, where there is only a single alignment marker insertion module and a single alignment marker removal module in said combined PCS and RS FEC module.

12. The apparatus of claim , wherein the network interface link is a 128 Gbps Fibre Channel network link.

13. A network switch comprising:
a control processor;
memory coupled to said control processor; and
a switching system coupled to said control processor, said switching system including:
a frame data storage system;
a header processing system coupled to said frame data storage system; and
a plurality of ports coupled to said frame data storage system, each of said plurality of ports including:
a frame data storage system interface coupled to said frame data storage system; and
a physical layer network interface link apparatus including:
a media access control (MAC) layer having an interface providing or receiving a stream of 64 bit blocks;
a combined physical coding sublayer (PCS) and Reed-Solomon (RS) forward error correction (FEC) sublayer module, said combined PCS and RS FEC module developed on a single chip;
a physical media attachment (PMA) layer having an interface connected to said combined PCS and RS FEC module; and
a physical media dependent (PMD) layer connected to said PMA layer and for connection to an external network link,
wherein said combined PCS and RS FEC module includes:
a MAC interface connected to said MAC layer interface;
a PMA interface connected to said PMA layer interface utilizing four lanes;
an RS FEC encoder module; and
an RS FEC decoder module, and wherein said combined PCS and RS FEC module operates using only four lanes.

14. The network switch of claim 13, said combined PCS and RS FEC module further including:
a transmit path; and
a receive path,
wherein said transmit path includes:
an encode module connected to said MAC interface;
a scramble module connected to said encode module;
a block distribution module connected to said scramble module;
a transmit transcode module to transcode from 64b/66b blocks to 256b/257b blocks connected to said block distribution module;
an alignment marker insertion module connected to said transmit transcode module;
said RS FEC encode module connected to said alignment marker insertion module; and
a symbol distribution module connected to said RS FEC encode module and said PMA interface, and
wherein said receive path further includes:
an alignment lock and deskew module connected to said PMA interface;
a lane reorder module connected to said alignment lock and deskew module;
said RS FEC decoder module connected to said lane reorder module;
an alignment marker removal module connected to said RS FEC decoder module;
a receive transcode module to transcode from 256b/257b blocks to 64b/66b blocks connected to said alignment marker removal module;
a descramble module connected to said receive transcode module;
a decode module connected to said descramble module and said MAC interface.

15. The network switch of claim 14, wherein said alignment markers are in the form of an alignment marker pair, said alignment marker pair including a first alignment marker for lane zero and a second alignment marker for the appropriate lane on which said alignment marker pair is provided.

16. The network switch of claim 15, wherein said alignment markers do not include bit interleaved parity (BIP) fields but include fixed DC balanced values instead.

17. The network switch of claim 14, where there is only a single alignment marker insertion module and a single alignment marker removal module in said combined PCS and RS FEC module.

18. The network switch of claim 13, wherein the external network interface link is a 128 Gbps Fibre Channel network link.

* * * * *